June 18, 1929.　　　V. P. MARRAN　　　1,717,571
TRACTOR DRIVEN SNOWPLOW
Filed Jan. 31, 1927　　　2 Sheets-Sheet 1
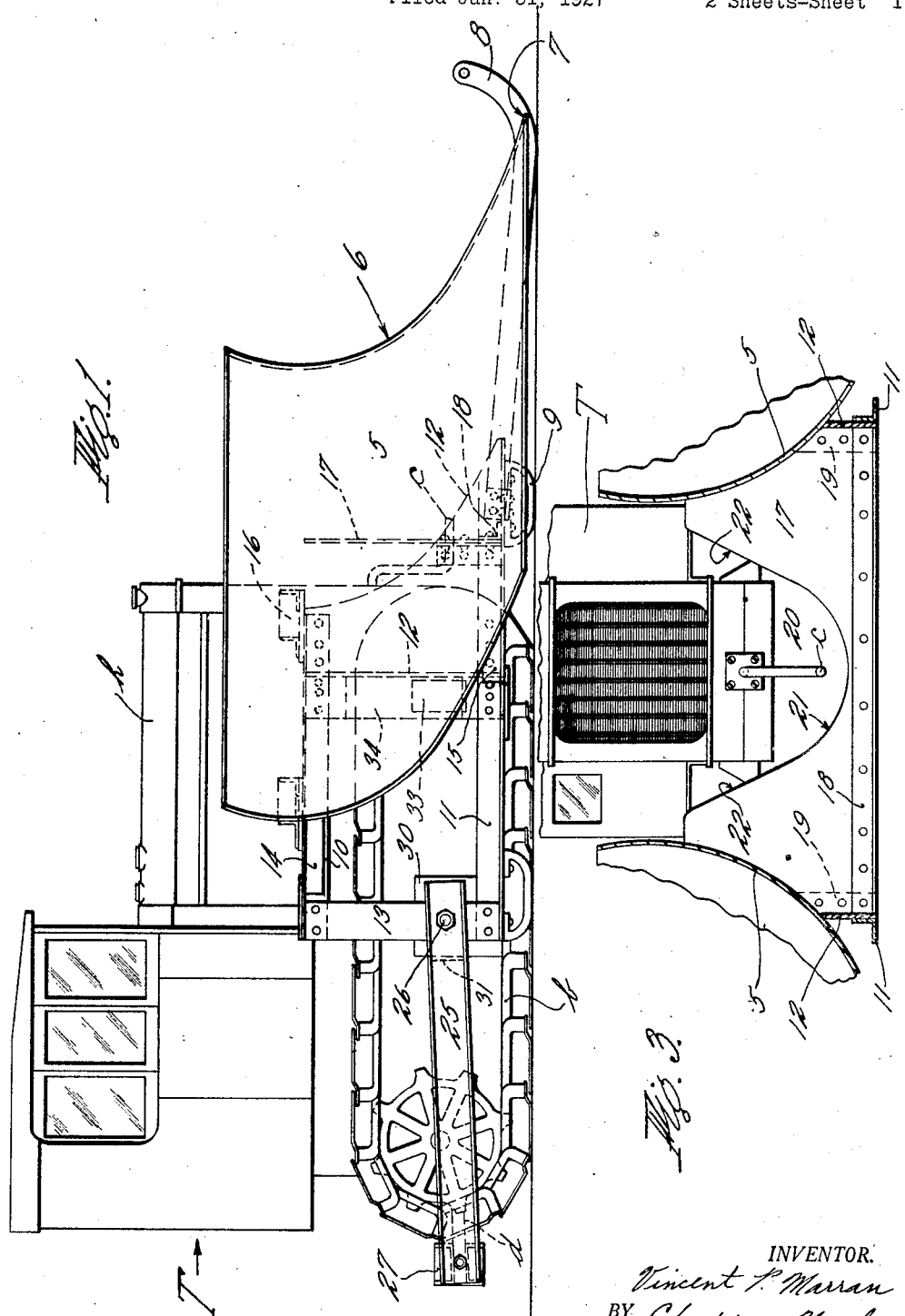
INVENTOR.
Vincent P. Marran
BY Chapin & Neal
ATTORNEYS.

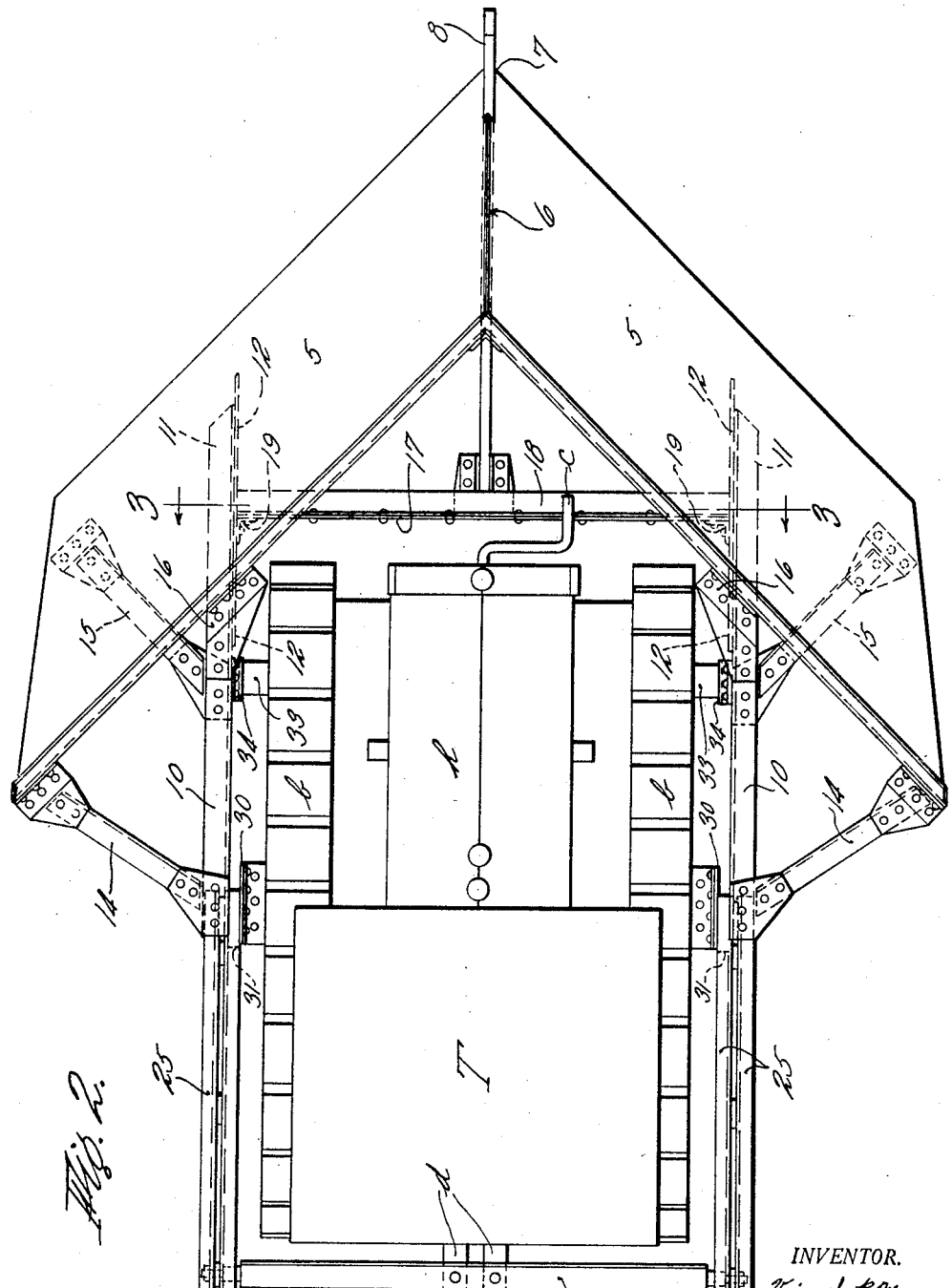

Patented June 18, 1929.

1,717,571

UNITED STATES PATENT OFFICE.

VINCENT P. MARRAN, OF HOLYOKE, MASSACHUSETTS.

TRACTOR-DRIVEN SNOWPLOW.

Application filed January 31, 1927. Serial No. 164,801.

This invention relates to tractor-driven snowplows and it is particularly concerned with improvements which enable the plow to be turned by the tractor, for steering purposes, more easily and about a shorter radius.

The tractor is located behind the plow and pushes the latter by means of two laterally-spaced, side frame members. These are fixed to the plow and extend rearwardly thereof one on each side of the tractor. The tractor is generally of the endless traction belt type, wherein steering is effected by varying the relative speed of the two traction belts, whereby the tractor can be easily turned about a short radius. The tractor turns the plow by abutting one or the other of the side frame members and cooperating buffer members are provided for this purpose. It has been the practice, heretofore, so far as I am aware, to provide but one pair of cooperating buffer members on each side of the tractor. It has also been the practice, heretofore, to have the forward end of the tractor enter only a short ways between said side frame members. The front end of the tractor has been relatively remote from the point of the plow so that room was available only for one pair of buffer members on each side of the tractor. As the point of the plow is located more remote from the center of the tractor, it becomes more difficult to turn the plow and a larger radius is necessary in which to turn the plow. Thus, the remoteness of the tractor from the plow and the lack of room for an adequate arrangement of buffer members each contribute to make steering difficult.

The difficulties described, so far as large, heavy-duty plows are concerned, has arisen from the use of a cross frame member which is, nevertheless, a very necessary part of a heavy duty plow. Such member is necessary to connect and brace the two walls of the plow and to connect and brace the side frame members. A plow which lacks such a member is not a heavy duty plow. This cross frame member, both by its construction and location, has limited the distance available for the plow to enter between the side frame members and has caused the point of the plow and the front end of the tractor to be relatively widely separated. According to prior practice, the cross frame member consists of a gusset plate, which extends across between the plow walls and by its location prevents the tractor from closely approaching the point of the plow. Also, this plate, by reason of its construction blocks all access to the starting crank of the tractor. Thus, room enough has to be left between such plate and the front end of the tractor for an operator to stand and turn the crank and the front end of the tractor could not closely approach the plate.

According to my invention, I have moved the cross frame member so far forwardly that it no longer presents a limiting obstacle to the entrance of the tractor, allowing the tractor to come as closely as feasible to the plow walls, and I have so constructed said member as to provide a recess to enable the operator to operate the starting crank while standing in the space between the cross frame member and the point of the plow. In this way, the front end of the tractor can be brought much closer to the point of the plow and the plow can therefore be turned more easily and about a smaller radius.

Other objects and advantages will appear in the following description and will be pointed out in the appended claims.

The invention will be disclosed with reference to the accompanying drawings, in which:—

Figs. 1 and 2 are side elevational and plan views, respectively, of a tractor driven snowplow embodying my invention; and Fig. 3 is a fragmentary cross sectional view taken on the line 3—3 of Fig. 2.

Referring to these drawings; the snowplow includes two suitably curved plow walls 5, usually of heavy boiler plate, and these walls are disposed in V-form or in forwardly converging relation. The walls 5 are suitably joined together, as indicated in Fig. 2, where they intersect to form the edge 6, and this edge at its lower end terminates with a plow point 7. A central runner 8 is usually provided at the point of the plow and this runner is supplemented by other suitable runners, such as that shown at 9 in Fig. 1.

Each side frame member, in the particular form shown, includes upper and lower, horizontally-disposed angle irons 10 and 11 and a vertical gusset plate 12, to which the forward ends of the angle irons are fixed and by which they are rigidly connected; and a vertically disposed plate 13, which connects the angle irons at their rear ends and to which they are rigidly secured. Each set of upper and lower angle irons 10 and 11 are rigidly connected to the adjacent plow wall 5 by angle iron braces 14 and 15, respectively, which extend outwardly and forwardly and connect with the plow wall near the outer end thereof. The front end of each upper angle iron 10, where it meets its plow wall is connected thereto by an angle iron 16. The front edge of gusset plate 12 is cut to conform to the curvature of the plow wall as indicated in Fig. 1 and abuts therewith. The particular construction of the side frame members, as just described, and the way in which they are attached to the plow is not at all essential and may be varied as desired. The main point is that there are two laterally-spaced side frame members, of any suitable type, which are fixed to the plow and extend rearwardly thereof in substantially parallel relation.

The cross frame member, in the form herein disclosed, consists of a gusset plate 17, cut out in the form best shown in Fig. 3, and a reenforcing angle iron 18, which is secured to the gusset plate and extends along the lower edge thereof. The lower portions of the side edges of the gusset plate are parallel and vertically disposed and these portions abut the two laterally-spaced gusset plates 12 of the side frame members, to which they are suitably secured, as by the angle irons 19. The remainder of the side edges of plate 17 are curved to conform with the curvature of the plow walls 5, where they intersect therewith. This plate 17 extends high enough so that it abuts the plow walls over a substantial distance and enough to secure adequate cross bracing of the plow walls. It has been usual, heretofore, for the plate 17 to extend, full width, across from one plow wall to the other. According to my invention, however, I cut away a great deal of the plate 17, in the central portion thereof, to provide a very deep recess 20 which extends rather close to the bottom edge of the plate. The lower boundary wall of the recess indicated at 21 is an arc of a circle and the side boundary walls 22 extend tangentially to wall 21 and in upwardly diverging relation. The plate 17 is thus virtually divided into two sections, each of which is fashioned much like a buttress and they function as such. These buttresses are connected by a relatively narrow central portion which would be insufficient of itself to withstand the thrusts imposed on the buttresses and might buckle under the strains. To compensate for this difficulty, which is the necessary result incident to the provision of recess 20, I reenforce the lower edge of the plate 17 by the angle iron 18 and thus prevent any possible buckling of the center of plate 17 and also add to the strength of the cross frame member. The whole as constructed, is to all intents and purposes, the equivalent of a lower cross member with struts or braces secured thereto at or near the center and extending in upwardly diverging fashion to meet the plow walls.

The tractor, indicated generally by reference letter T, is shown in more or less conventional form. It includes two endless traction belts $b$ the relative speeds of which can be varied, in the usual and well known manner, for steering purposes. The engine of the tractor (not shown) is located at the front end thereof beneath the hood $h$ and projecting from the front end of the tractor is the conventional crank $c$, by means of which the engine may be manually turned over for starting purposes. At the rear of the tractor is a draft rigging, indicated conventionally at $d$.

The plow is connected to the tractor draft rigging by means of two pusher members 25 one on each side of the tractor. The front end of each member 25 is pivotally connected at 26 to a side frame member of the plow and at its rear end to a cross bar 27, which in turn is suitably connected to the draft rigging $d$ of the tractor.

About midway between the front and rear ends of the tractor, and arranged one on each side thereof, are suitable buffer members 30, designed to engage cooperating buffer members 31, secured one to each pusher member 25 and at the front end thereof. The members 31 are located just opposite the rear ends of the side frame members of the plow and the result is the same as if the buffers 31 were secured to said side frame members, as the latter and not the pusher members take the lateral shocks imposed. Similar cooperating pairs of buffer members, each pair of which comprises an element 33 secured to the tractor and an element 34 fixed to a side frame member of the plow, are provided one on each side of the tractor and spaced well toward the front thereof. Thus, the pairs of cooperating buffer members on each side of the tractor are substantially spaced apart in a longitudinal direction. Considering Fig. 2 and assuming that the upper belt $b$ is travelling faster than the lower belt, so that the tractor will turn in a course which is downward of the drawing, then the upper rear buffer 30 pushes on the rear end of the upper side frame member of the plow and the lower front buffer 33 pushes on the lower side frame member of the plow near its front end. In this way, the tractor on each side pushes laterally on the plow in opposite directions and at locations such that the very heavy and bulky plow can be turned with ease, as compared to prior practice where only one buffer was used on each side of the tractor and these were located near the front end of the tractor and acted on the rear end of the side frame members.

The location and construction of the cross frame member of the plow permit the result described. The tractor is permitted to enter between the side frame members of the plow until the front end thereof is as close as is feasible to the upper intersection point of the plow walls. The front ends of the traction belts *b* are brought relatively close to the plow walls. The effort is to bring the center of mass of the plow much nearer to the center of mass of the tractor so that it is easier to turn the plow and so that the plow can be turned on a shorter radius. To this end, the cross frame member has been located as far forwardly as possible and so far forwardly that it no longer limits the distance to which the tractor can enter between the side frame members. It is true that, except for the recess 20 in the cross frame member, the latter would limit said distance because of the abutment of the crank *c* therewith, but such recess, as shown, permits the crank to pass therethrough and is of such dimensions and so located that the crank may be freely turned. There is just room enough ahead of the cross frame member to permit an operator to stand and crank the engine. At the very least, there is a saving of the "cranking" space as a result of the arrangement described. That is, if the operator had to stand in front of the cross member, the front end of the tractor would have to be spaced back from the cross frame member enough to allow room for cranking. The saving of the "cranking" space and the additional saving of space effected by moving the cross frame member ahead as far as is feasible, permits the centers of mass of the tractor and plow to be brought much more closely together than has heretofore been possible with a heavy duty plow of the type in which a cross frame member is indispensably necessary.

Thus, I have provided improvements in tractor driven snowplows which permit the plow to be steered more easily from the tractor and turned about a smaller radius than in the prior tractor driven snowplows of which I am aware.

The invention has been disclosed herein, in an embodiment at present preferred for illustrative purposes but the scope of the invention is defined by the appended claims rather than by the foregoing description.

What I claim is:

1. In combination, a tractor, a snowplow located ahead of the tractor and having fixed thereto laterally-spaced side frame members which extend rearwardly from the plow one one each side of the tractor to a point substantially midway of the tractor, buffer members on the tractor and cooperating buffer members on said frame members, whereby the plow may be moved laterally by the tractor to follow the steered course thereof, said buffer members arranged in longitudinally spaced pairs on each side of the tractor, there being a pair of cooperating buffer members located substantially midway of the tractor and on each side thereof and another pair located forwardly near the front end of the tractor and on each side thereof.

2. In combination, a tractor having a forwardly located engine and a crank at its front end for manually cranking the engine, a snowplow having plow walls disposed in V-fashion and located just ahead of the tractor, a pair of laterally spaced side frame members, rigidly connected one to each of the plow walls and extending rearwardly one on each side of the tractor to a point substantially midway of its length, driving means connecting the tractor to said side frame members, buffer members provided on the tractor and cooperating buffer members provided on said side frame members, said buffer members arranged in longitudinally spaced pairs on each side of the tractor, and a cross frame member extending between the plow walls and said side frame members and located just back of the point of the plow sufficiently to provide space for an operator to crank said engine and so far forwardly of the plow that it allows the tractor to enter as closely as feasible to the point of the plow, said cross frame member formed to provide a recess to permit rotation of said crank.

3. In combination, a tractor having a forwardly located engine and a crank at its front end for manually cranking the engine, a snowplow having plow walls disposed in V-fashion and located just ahead of the tractor, a pair of laterally spaced side frame members rigidly connected one to each of the plow walls and extending rearwardly one on each side of the tractor and connected thereto, and cross frame means for interconnecting and laterally bracing said plow walls at a level below the lowermost extremity of said crank and for effecting a diagonal bracing of said walls along lines which extend from points on said walls substantially above said level downwardly and inwardly in converging relation to said level, said cross frame means located sufficiently back from the point of the plow to provide space for an operator to stand and crank the tractor and affording by said diagonal bracing arrangement a recess to permit rotation of said crank.

4. In combination, a tractor having a forwardly located engine and a crank at its front end for manually cranking the engine, a snowplow having plow walls disposed in V-fashion and located just ahead of the tractor, a pair of laterally spaced side frame members rigidly connected one to each of the plow walls and extending rearwardly one on each side of the tractor and connected thereto, and a gusset plate having a part extending crosswise between said side frame members at a level below the lowermost level of said crank and connected to said members, said plate having integral parts which upstand from the first named part and abut the plow walls at all points over a substantial vertical range, said last named parts serving as buttresses to brace upper parts of the plow walls from the first-named interconnecting part and shaped to afford between them a recess which permits rotation of said crank.

5. In combination, a snowplow having fixed thereto two laterally-spaced frame members which extend rearwardly in spaced parallel relation, a tractor the forward part of which is received between said members and behind the plow, said tractor having a starting crank at its front end, and a gusset plate having a part which extends crosswise between said members and laterally braces them at a level below the lowermost part of said crank and two other buttress-like parts which upstand from the first named part and are laterally spaced to provide clearance for rotation of said crank.

In testimony whereof I have affixed my signature.

VINCENT P. MARRAN.